(No Model.)

W. SCHENKER.
SPRING BOLT.

No. 255,199. Patented Mar. 21, 1882.

WITNESSES:
Fred. G. Dieterich
Jno. W. Stockett

INVENTOR.
William Schenker
by C. A. Snow & Co.
ATTORNEYS.

UNITED STATES PATENT OFFICE.

WILLIAM SCHENKER, OF DENVER, COLORADO.

SPRING-BOLT.

SPECIFICATION forming part of Letters Patent No. 255,199, dated March 21, 1882.

Application filed December 14, 1881. (No model.)

*To all whom it may concern:*

Be it known that I, WILLIAM SCHENKER, of Denver, in the county of Arapahoe and State of Colorado, have invented certain new and useful Improvements in Spring-Bolts; and I do hereby declare that the following is a full, clear, and exact description of the invention, which will enable others skilled in the art to which it appertains to make and use the same, reference being had to the accompanying drawings, which form a part of this specification.

Figure 1:
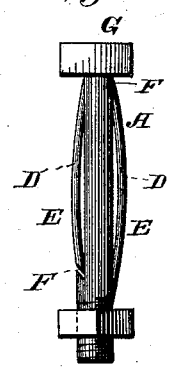
Figure 2:

Figure 1 is a side view of my improved spring-bolt, and Fig. 2 is a cross-section of the same.

Corresponding parts in the several figures are denoted by like letters of reference.

This invention relates to screw-bolts for various purposes; and it consists in constructing or providing such bolts with springs for the purpose of holding them in the openings in which they are placed, as will be hereinafter fully described, and particularly pointed out in the claim.

The drawings hereto annexed show the bolt A, provided with one or more longitudinal recesses, D, extending along the greater part of the length of the body of the bolt, and adapted to receive flat outwardly-bulging springs E, which are held in position by lips F at the ends of the recesses. The lip at the upper end may, as shown, be formed by the head G of the bolt, under or into which the recesses may extend, as shown. The springs E may be welded or otherwise secured to the bolt at one end; but this is not necessary. When this is done, however, the lips F may of course be dispensed with.

The operation and advantages of my invention will be readily understood. It is simple, inexpensive, and the springs E serve to hold the bolt firmly in the opening in which it may be adjusted without being affected by shaking and jarring.

Having thus described my invention, what I claim, and desire to secure by Letters Patent of the United States, is—

A screw-bolt having longitudinal recesses D, lips F, and springs E, substantially as and for the purpose set forth.

In testimony that I claim the foregoing as my own I have hereto affixed my signature in presence of two witnesses.

WILLIAM SCHENKER.

Witnesses:
ED O'HARE,
FRED. W. OTT.